(12) United States Patent
Del Vigna, Jr. et al.

(10) Patent No.: US 7,328,331 B2
(45) Date of Patent: Feb. 5, 2008

(54) METHOD AND SYSTEM OF ALIGNING EXECUTION POINT OF DUPLICATE COPIES OF A USER PROGRAM BY COPYING MEMORY STORES

(75) Inventors: Paul Del Vigna, Jr., San Jose, CA (US); Robert L. Jardine, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 354 days.

(21) Appl. No.: 11/042,427

(22) Filed: Jan. 25, 2005

(65) Prior Publication Data

US 2006/0168434 A1    Jul. 27, 2006

(51) Int. Cl.
*G06F 9/52*    (2006.01)
(52) U.S. Cl. .................................... 712/225
(58) Field of Classification Search .......... 712/225, 712/227; 714/11, 12, 23, 45, 47, 707
See application file for complete search history.

(56) References Cited

U.S. PATENT DOCUMENTS

| | | | |
|---|---|---|---|
| 5,384,906 A | 1/1995 | Horst | |
| 5,600,784 A | 2/1997 | Bissett et al. | |
| 5,615,403 A | 3/1997 | Bissett et al. | |
| 5,751,955 A | 5/1998 | Sonnier et al. | |
| 5,790,397 A | 8/1998 | Bissett et al. | |
| 5,896,523 A | 4/1999 | Bissett et al. | |
| 5,956,474 A | 9/1999 | Bissett et al. | |
| 6,003,116 A * | 12/1999 | Morita et al. | 711/141 |
| 6,038,685 A | 3/2000 | Bissett et al. | |
| 6,085,333 A * | 7/2000 | DeKoning et al. | 714/7 |
| 6,247,143 B1 * | 6/2001 | Williams | 714/11 |
| 6,279,119 B1 | 8/2001 | Bissett et al. | |
| 6,327,668 B1 | 12/2001 | Williams | |
| 6,393,582 B1 | 5/2002 | Klecka et al. | |
| 6,418,540 B1 * | 7/2002 | Dempsey et al. | 714/13 |
| 6,473,869 B2 | 10/2002 | Bissett et al. | |
| 6,604,177 B1 | 8/2003 | Kondo et al. | |
| 7,043,728 B1 * | 5/2006 | Galpin | 718/102 |
| 2003/0177311 A1 * | 9/2003 | Kurokawa et al. | 711/114 |
| 2004/0044878 A1 * | 3/2004 | Evans et al. | 712/34 |

\* cited by examiner

*Primary Examiner*—Eric Coleman

(57) ABSTRACT

A method and system of aligning execution point of duplicate copies of a user program by copying memory stores. Some of the exemplary embodiments may be a method comprising aligning the execution point of duplicate copies of a user program executed in a first and second processor by copying only data of memory stores performed by the user program in the first processor from a memory of the first processor to a memory of the second processor, and copying the register state of the user program from the first processor for use by the second processor.

31 Claims, 6 Drawing Sheets

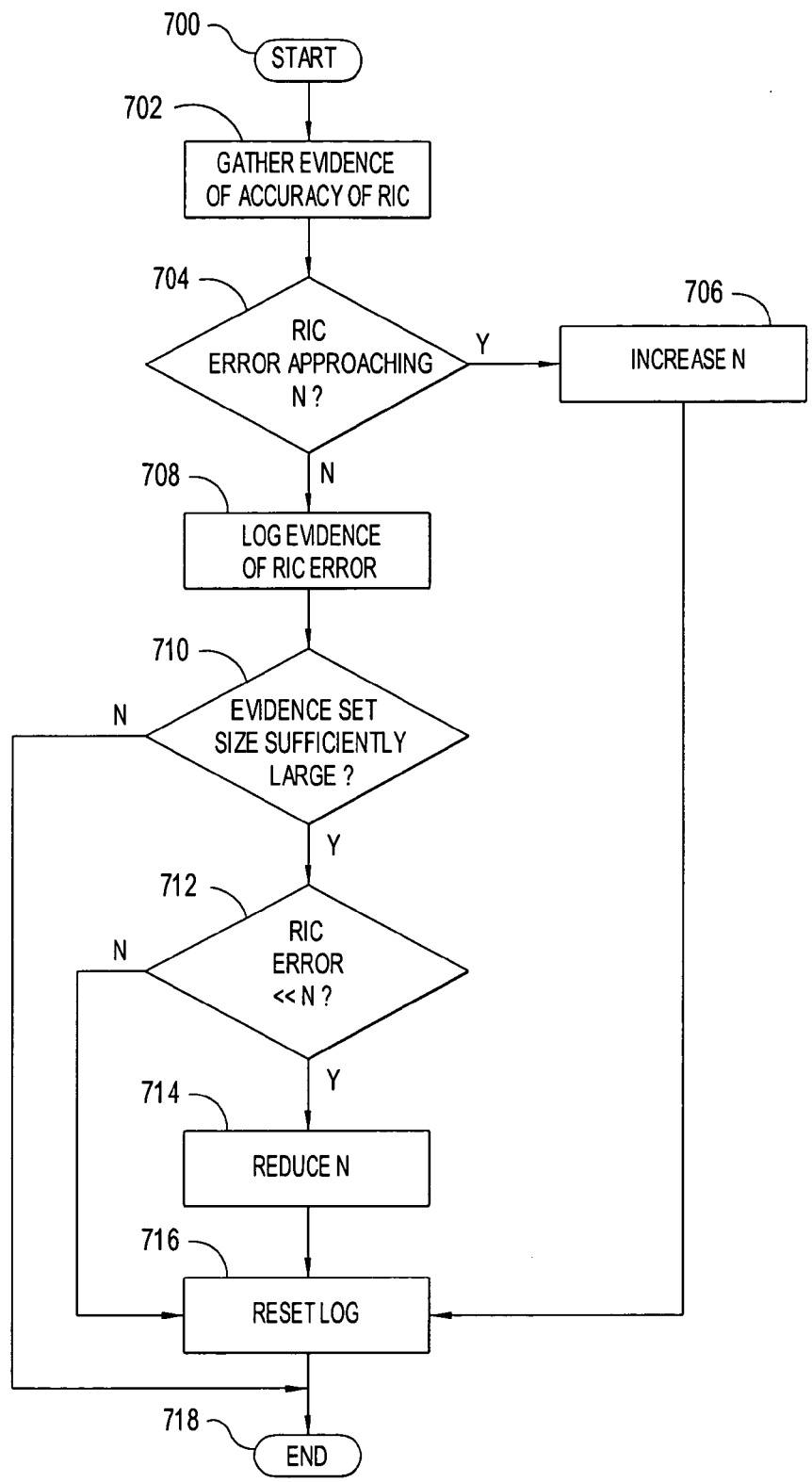

METHOD AND SYSTEM OF ALIGNING EXECUTION POINT OF DUPLICATE COPIES OF A USER PROGRAM BY COPYING MEMORY STORES

CROSS-REFERENCE TO RELATED APPLICATIONS

This application is related to co-pending U.S. patent application Ser. No. 11/042,981, filed Jan. 25, 2005, titled, "Method and System of Determining Whether An Application Program Has Made A System Level Call," which is incorporated by reference herein as if reproduced in full below.

BACKGROUND

Loosely lock-stepped processors are processors executing duplicate copies of a user program, but the processors need neither execute their respective copies of the user program in a step-for-step fashion nor at the same wall clock time. Loosely lock-stepped processors may be used to detect and correct computational faults, such as caused by cosmic radiation, and also may be used to ensure the user program continues to operate in spite of a hardware failure.

Because of slight differences in clocking frequency, or correctable soft errors experienced in one processor but not others, one processor may lead in its execution point within the user program, and it is difficult to determine whether a user program in a processor leads or lags. A comparison of program counters or instruction pointers may not adequately identify a user program's execution point inasmuch all the user programs may be in the same software loop, but at different iterations of the loop, and yet the instruction pointer may be the same. Further, some processors implement retired instruction counters in their performance monitoring unit that attempts to count each retired instruction. A comparison of retired instruction counter values may be insufficient inasmuch as retired instruction counters are included for performance monitoring purposes, and do not necessarily correctly count each and every retired instruction. For example, some processors have the ability to cease loading of new instructions once the retired instruction counter reaches a particular value; however, a pipelined processor may have several instructions still in the pipeline that complete and that are not counted by the retired instruction counter, known as a sliding stop. Moreover, processor manufacturers do not guarantee that their retired instruction counters are one hundred percent accurate.

SUMMARY

The problems noted above are solved in large part by a method and system of aligning execution point of duplicate copies of a user program by copying memory stores. Some of the exemplary embodiments may be a method comprising aligning the execution point of duplicate copies of a user program executed in a first and second processor by copying only data of memory stores performed by the user program in the first processor from a memory of the first processor to a memory of the second processor, and copying the register state of the user program from the first processor for use by the second processor.

BRIEF DESCRIPTION OF THE DRAWINGS

For a detailed description of exemplary embodiments of the invention, reference will now be made to the accompanying drawings in which:

FIG. 7 is an illustrative flow diagram of adaptively adjusting the value of N used in accordance with embodiments of the invention.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure. In addition, one skilled in the art will understand that the following description has broad application, and the discussion of any embodiment is meant only to be exemplary of that embodiment, and not intended to intimate that the scope of the disclosure is limited to that embodiment.

Figure 1:
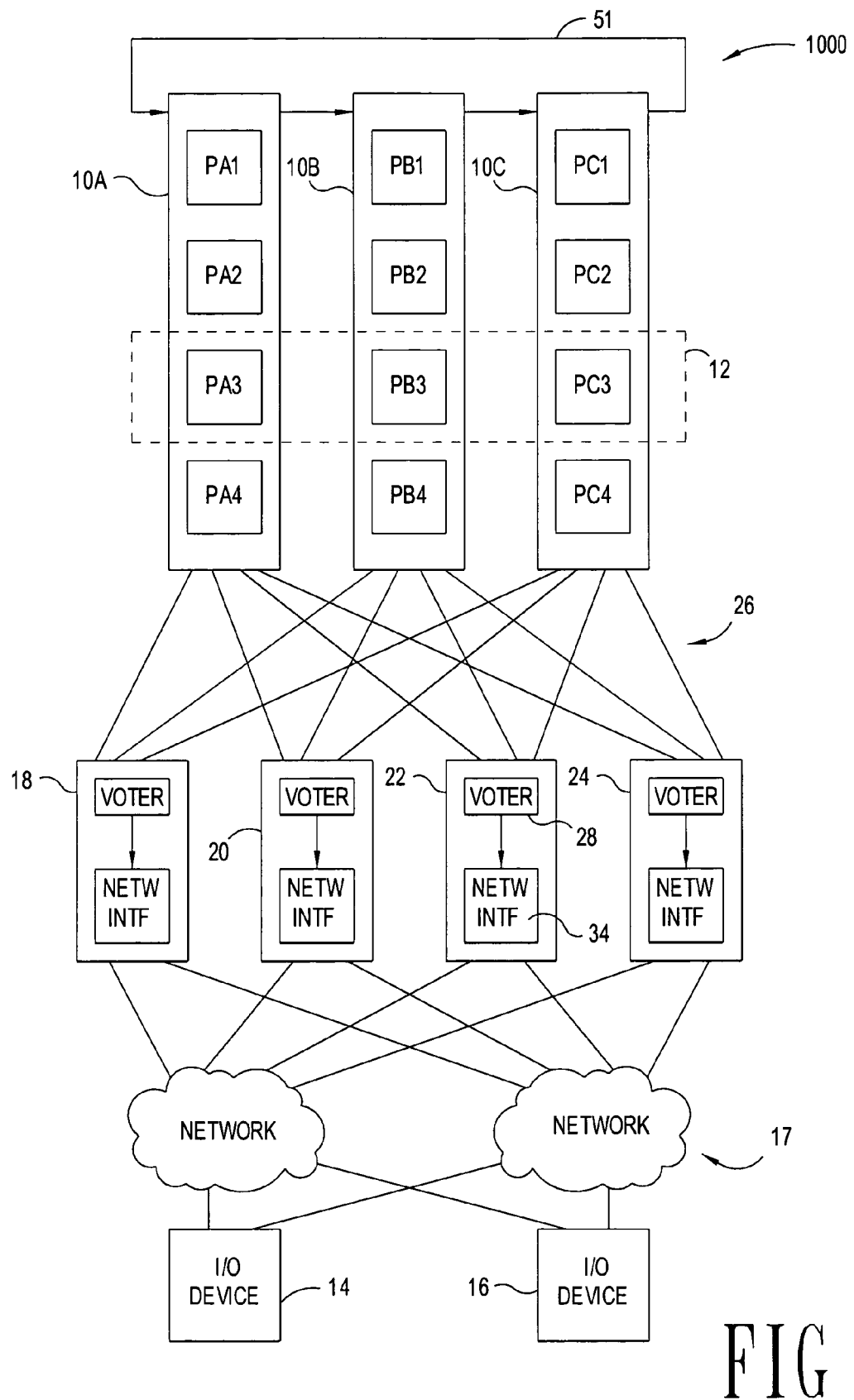
FIG. 1 illustrates a computing system in accordance with embodiments of the invention.

FIG. 1 illustrates a computing system 1000 in accordance with embodiments of the invention. In particular, the computing system 1000 may comprise a plurality of multiprocessor computer systems 10. In some embodiments, only two multiprocessor computer systems 10 may be used, and as such the computing system 1000 may implement a dual-modular redundant (DMR) system. As illustrated in FIG. 1, the computing system 1000 comprises three multiprocessor computer systems 10, and therefore implements a tri-modular redundant (TMR) system. Regardless of whether the computer system is dual-modular redundant or tri-modular redundant, the computing system 1000 implements fault tolerance by redundantly executing user programs across the multiprocessor computer systems.

In accordance with embodiments of the invention, each multiprocessor computer system 10 preferably comprises one or more processors, and as illustrated in FIG. 1 four processors. Each processor of FIG. 1 has a leading "P," indicating a processor. Further, each processor is given a letter designation of "A," "B," or "C," to indicate the processor's physical location within one of the multiprocessor computer systems 10A, 10B and 10C respectively. Finally, each processor is given a numerical designation to indicate that processor's location within each multiprocessor computer system. Thus, for example, the processors in multiprocessor computer system 10A have designations "PA1," "PA2," "PA3," and "PA4."

In accordance with embodiments of the invention, at least one processor from each multiprocessor computer system 10 may be logically grouped to form a logical processor 12. In the exemplary embodiments illustrated in FIG. 1, processors PA3, PB3, and PC3 may be grouped to form the logical processor 12. In accordance with embodiments of the invention, each processor within a logical processor substantially simultaneously executes the same user program, thus implementing fault tolerance. More particularly, each processor within a logical processor is provided the same instruction stream for the user program and computes the same results (assuming no errors), but the processors within the logical processor are not in strict or cycle-by-cycle lock-step; rather, the processors are loosely lock-stepped, with handling of interrupts occurring based on rendezvous opportunities, such as system calls (discussed below). In accordance with some embodiments, the processors may have non-deterministic execution, and thus strict lock-step may not be possible. In the event one of the processors fails, the one or more remaining processors may continue without affecting overall system performance.

Inasmuch as there may be two or more processors within a logical processor executing the same user programs, duplicate reads and writes may be generated, such as reads and writes to input/output (I/O) devices 14 and 16. The I/O devices 14 and 16 may be any suitable I/O devices, e.g., a network interface card, a floppy drive, a hard disk drive, a CD ROM drive and/or a keyboard. In order to compare the reads and writes for purposes of fault detection, each logical processor has associated therewith a synchronization logic. For example, processors PA1, PB1 and PC1 form a logical processor associated with synchronization logic 18. Likewise, the processors PA2, PB2 and PC2 form a logical processor associated with synchronization logic 20. The logical processor 12 is associated with synchronization logic 22. Finally, processors PA4, PB4 and PC4 form a logical processor associated with synchronization logic 24. Thus, each multiprocessor computer system 10 couples one each to each of the synchronization logics 18, 20, 22 and 24 by way of an interconnect 26. The interconnect 26 may be a Peripheral Component Interconnected (PCI) bus, and in particular a serialized PCI bus, although other communication schemes may be equivalently used.

Each synchronization logic 18, 20, 22 and 24 comprises a voter logic unit, e.g., voter logic 28 of synchronization logic 22. The following discussion, while directed to voter logic 28 of synchronization logic 22, is equally applicable to each voter logic unit in each of the synchronization logics 18, 20, 22 and 24. The voter logic 28 acts to consolidate read and write requests from the processors, and plays a role in the exchange of information between processors, possibly for synchronization of the logical processors. Consider for purposes of explanation each processor in logical processor 12 executing its copy of a user program, and that each processor generates a read request to network interface 34. Each processor of logical processor 12 sends its read request to the voter logic 28. The voter logic 28 receives each read request, compares the read requests, and (assuming the read requests agree) issues a single read request to the network interface 34.

In response to the single read request issued by a synchronization logic, the illustrative network interface 34 returns the requested information to the voter logic 28. In turn, the voter logic replicates and passes the requested information to each of the processors of the logical processor. Likewise, for other input/output functions, such as writes and transfer of packet messages to other programs (possibly executing on other logical processors), the synchronization logic ensures that the requests match, and then forwards a single request to the appropriate location. In the event that any one processor in a logical processor does not function properly (e.g., fails to generate a request, fails to generate a request within a specified time, generates a non-matching request, or fails completely), the overall user program continues based on requests of the remaining processor or processors of the logical processor.

In addition to consolidating reads and writes to external interfaces (such as network interface 34), and duplicating data returned from those external interfaces, synchronization logics also play a role in ensuring each processor is provided the same time of day when a request for that information is made. In particular, user programs may at certain points in their execution make system calls requesting time of day information. A system call is any call to a privileged program (executed in a higher privileged mode than a user mode), such as operating system programs. A system call to obtain time of day information is only one example of the family of programs that fall within the category of system calls, and the role of system calls in handling interrupts will be discussed more fully below. In order that each user program is provided the same time of day at corresponding points in the user program (in spite of the differences in wall clock time when those corresponding points are executed), synchronization logics in accordance with embodiments of the invention provide the time of day information to each processor in a logical processor, rather than those processors deriving time internally.

Figure 2:
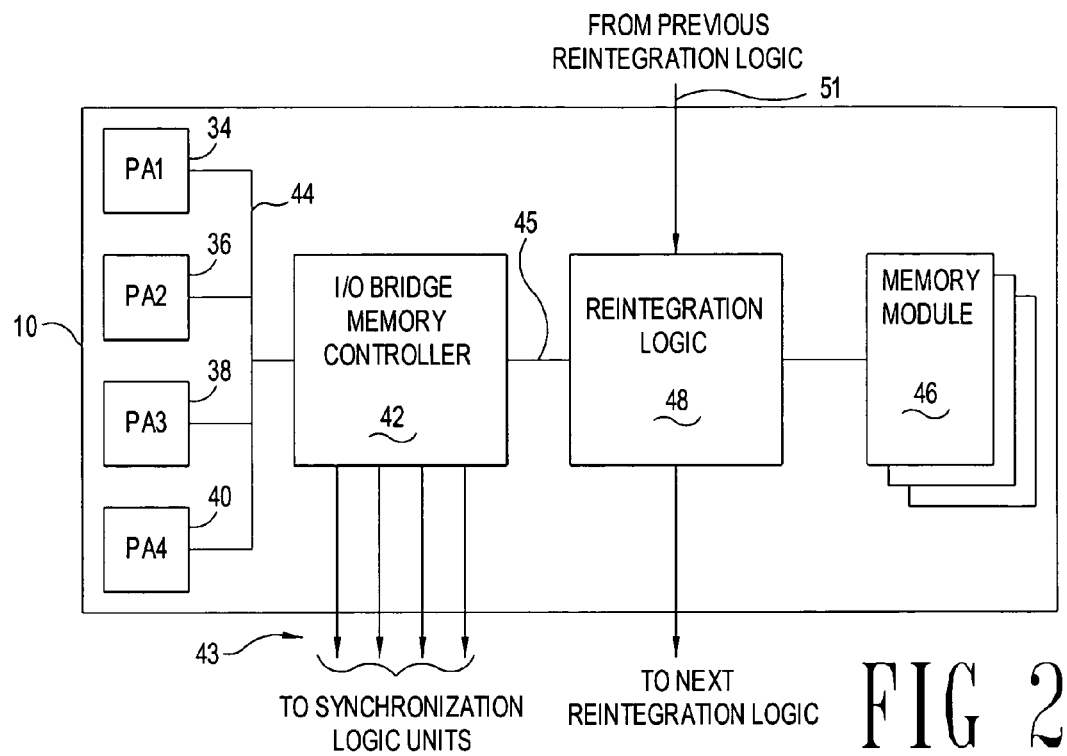
FIG. 2 illustrates in greater detail a computing system in accordance with embodiments of the invention.

FIG. 2 illustrates in greater detail a multiprocessor computer system 10. In particular, FIG. 2 illustrates that a multiprocessor computer system 10 in accordance with embodiments of the invention may have a plurality of processors, in the illustrative case of FIG. 2 four such processors 34, 36, 38 and 40. While only four processors are shown, any number of processors may be used without departing from the scope and spirit of the invention. The processors 34-40 may be individually packaged processors, processor packages comprising two or more processor dies within a single package, or multiple processors on a single die. Each of the processors may couple to an I/O bridge and memory controller 42 (hereinafter I/O bridge 42) by way of a processor bus 44. The I/O bridge 42 couples the processors 34-40 to one or more memory modules 46 by way of a memory bus 45. Thus, the I/O bridge 42 may control reads and writes to the memory area defined by the one or more memory modules 46. The I/O bridge 42 may also allow each of the processors 34-40 to couple to synchronization logics (not shown in FIG. 2), as illustrated by bus lines 43.

Still referring to FIG. 2, the memory defined by the one or more memory modules 46 may be partitioned, one partition for each processor, therefore allowing each of the processors to operate independently. In alternative embodiments, each processor may have its own integrated memory controller, and thus each processor may have its own dedicated memory, and this too would be within the contemplation of the invention. The processors 34-40 may also be non-deterministic processors not suitable for strict lock-step execution.

FIG. 2 further shows that each multiprocessor computer system 10 comprises a reintegration logic 48 coupled between the I/O bridge 42 and the memory modules 46. The illustrative embodiment of FIG. 1 show the interconnections of the reintegration logics (line 51) in the form of a ring, but any network topology may be equivalently used (e.g., ring, tree, dual rings, fully connected). In operation, the reintegration logic 48 is transparent to the I/O bridge 42, and does not interfere with reads and writes to the one or more memory modules 46. However, in the event that one processor within a logical processor experiences a fault and needs to be restarted, the reintegration logic 48 enables copying of at least the user program memory from another processor so that the formerly failed processor can begin at the same point as the non-failed processors in the logical processor.

In a loosely lock-stepped system, the reasons a processor may lead or lag may be many. For example, while each processor may execute instructions at substantially the same clock frequency, even minor differences in actual clock frequency may result in substantial differences over time. Moreover, processors implemented in accordance with at least some embodiments of the invention have non-deterministic execution, and thus even provided precisely the same user program, the processors may diverge greatly in the number of executing steps to arrive at the same execution point in the user program. Further still, some processors could encounter data access problems and/or errors. Some examples may be: one processor may experience a cache miss that other processors may not experience; one processor may experience a correctable memory error, thus requiring execution of a recovery routine not needed by the remaining processors; and one processor may experience a miss of the translation look-aside buffer, causing additional processing but not affecting final outcome of the user program. Again, while the processors eventually arrive at the same execution point in the user program, the number of instructions executed and the time required to execute those instructions may not be the same.

With the idea in mind that processors of a logical processor may be executing the same instruction stream, but may not be at the same point in the instruction stream, the discussion turns to handling of interrupts in such an environment. Even if the same interrupt is asserted to each processor at precisely the same wall clock time, by virtue of the loosely lock-stepped execution of their respective processors the interrupts may not be asserted at the same point in the instruction stream of each processor. The difficulty is further exacerbated by the fact that interrupt assertion itself is asynchronous. In order to ensure proper operation, each processor within a logical processor needs to service interrupts at the same execution point in the instruction stream of the user program. Ensuring interrupts are serviced at the same execution point in the instruction stream is accomplished in accordance with embodiments of the invention by utilizing the synchronization logic as a mechanism to agree on a rendezvous point at which to service the interrupt.

Figure 3:
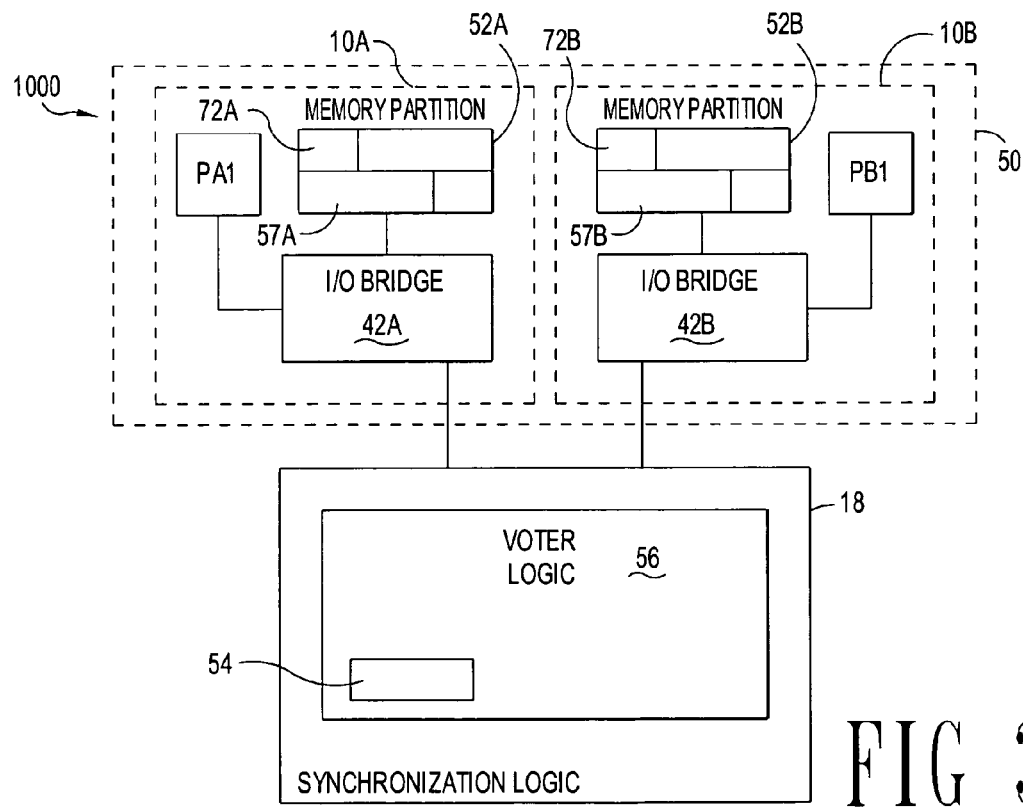
FIG. 3 illustrates a partial computing system in accordance with embodiments of the invention.

In accordance with embodiments of the invention, processors within a logical processor communicate with each other that: particular interrupts have been asserted; and a proposed point at which to service the interrupt. Stated otherwise, processors in a logical processor agree on which interrupt to be serviced (or to be serviced first) and also agree on a point at which to service the interrupt. FIG. 3 illustrates a partial computing system 1000 in order to describe the operation of the various components that work together to coordinate servicing of interrupts. FIG. 3 is a simplified version of the system of FIG. 1 in the sense that the logical processor 50 in this case comprises only two processors PA1 and PB1. FIG. 3 is also, in another sense, more detailed than FIG. 1 inasmuch as FIG. 3 illustrates the memory partition 52 for each processor, and how the processor couples to the memory partition and the voter logic through the I/O bridge 42. Thus, the logical processor 50 of FIG. 3 comprises one processor each from the multiprocessor computer systems 10A and 10B. Processor PA1 couples to I/O bridge 42A, which in turn couples both to the synchronization logic 18 and PA1 processor's memory partition 52A. Processor PB1 couples to its respective I/O bridge 42B, which in turn couples to the synchronization logic 18 and PB1 processor's memory partition 52B.

In accordance with at least some embodiments, having the processors of a logical processor exchange information for purposes of establishing a rendezvous point at which to service an interrupt involves each processor writing information to synchronization registers 54 in the voter logic 56 of the synchronization logic 18. A rendezvous point, in accordance with embodiments of the invention, may be in any suitable location, such as: each time a dispatcher program executes and sets other tasks to execution; traps and fault handlers; and system calls made by user programs. Inasmuch as it is envisioned that system calls will be the bulk of the rendezvous points, the balance of this specification refers to these rendezvous points as system calls. However, it will be understood that the term system call is used generically in this case to reference any potential rendezvous point. A system call number may be a number which indicates how many system calls have been made from an arbitrary starting point. For example, location 72 of FIG. 3 illustrates a location in a memory partition 52 at which a system call number resides. In alternative embodiments, the system call number may be equivalently stored in a register located other than in the memory partition 52. In the embodiments illustrated in FIG. 3, the synchronization registers 54 are pre-designated memory locations, but any location where data may be written will suffice. After some or all of the processors have written their respective information, voter logic 56 writes the information in the synchronization registers 54 back to corresponding set of registers 57 in each of the memory partitions 52. Much like registers 54, registers 57 are pre-designated memory locations in the memory partition 52, but any location where data may be written will suffice. Writing the information to the synchronization logic allows the processing of the user program to continue while waiting for the remaining processors to see the interrupt. By exchanging information the processors within a logical processor coordinates at what point in the user program to service an interrupt.

Interrupts may be asserted to a processor at any time by way of packet-based messages containing interrupt information. Interrupts may also be asserted to a processor from an internal source, such as a timer that is set to expire after some number of processor clock cycles. When such a packet or internal interrupt is received and detected by the processor, the user program is suspended and an interrupt handler routine is invoked. The purpose of the interrupt handler routine is to begin the process of identifying the rendezvous point. No action is taken with respect to the services requested by the interrupt by the interrupt handler routine. System calls are the points at which the process of scheduling the rendezvous point is completed, and also the point at which scheduling programs to service the interrupts is made. For more information regarding scheduling of interrupts based on system calls, reference may be made to co-pending U.S. patent application no. (HP Ref. 200316143-1 (CR Ref. 2162-22100)) titled, "Method and System of Loosely Lock-Stepped Non-Deterministic Processors," which is incorporated by reference herein as if reproduced in full below.

Thus, coordinating servicing of interrupts is accomplished at system calls and other operating system transitions in accordance with embodiments of the invention. However, there may be user programs that, for extended periods of time, do not make system calls. Therefore, it is possible that processors within a logical processor may significantly diverge with respect to the portion of a user program that they are executing, and/or further may not have ample opportunity to service interrupts. A user program that does not make system calls with sufficient frequency is called an "uncooperative process."

Handling of uncooperative processes in accordance with embodiments of the invention has several phases. The first phase is identification that a user program is indeed uncooperative. The second phase is identifying the memory locations at which the user programs potentially (but not necessarily) are different. The third phase is taking action to ensure that the uncooperative process in each processor of a logical processor is at the same stage of execution, also known as aligning the execution point. Finally, the last phase may be modifying the formerly uncooperative process. Each of these phases will be addressed in turn.

In some embodiments, identifying that a user program makes too few system calls, and is therefore considered uncooperative, involves the use of a timer. If the user program does not make a system call before the expiration of the timer, then the user program is an uncooperative process. In accordance with some embodiments of the invention, each time the dispatcher program of a processor (operating in the highest privilege state—kernel mode) sets a user program to execution, the dispatcher also: resets the processor's retired instruction counter; sets the retired instruction counter to count only user (lowest level privilege) instructions; starts an uncooperative process timer; and stores an indication of the current system call number. The retired instruction counter is a counter implemented, for example, in the performance monitoring unit of most commercially available processors. The value of the retired instruction counter is incremented upon the completed execution of each user level instruction by the processor. With regard to the uncooperative process timer, Itanium® processors made by Intel® may be used to detect uncooperative processes by arming the Interval Time Counter (ITC) and the Interval Time Match (ITM) registers. It is noted that if Itanium® processors are used, compiler inserted speculative instructions, e.g., a load.s and load.chk pair, are not permitted in user programs as these could significantly affect retired instruction count values. The ITC is a free running counter that begins counting upon power-up of the processor. By "free running," it is meant that the ITC counts regardless of the number and/or types of instructions being executed, the ITC cannot be stopped by any instruction (regardless of privilege), and the value of the ITC cannot be changed by any user instruction. Starting the uncooperative process timer in these embodiments thus means reading the value of the ITC, and placing a value in the ITM that represents the value of the ITC when the desired amount of time has passed. When the value of the ITC and ITM registers are equal, an interval timer interrupt is asserted. Although the uncooperative process timer in these illustrative embodiments does not truly "expire," discussion of the value of the ITC matching the ITM from this point forward will be referred to as an "expiration of the timer" so as to generically apply to any timer-type system used as an uncooperative process timer. For processors that do not implement ITC/ITM type timing capability, a periodic timer interrupt may be used in combination with a register to track the number of interrupts, and to perform the uncooperative process related tasks after a predetermined number of periodic timer interrupts have occurred. Turning again to the uncooperative process timer generically, at the expiration of the timer, an interrupt is asserted which invokes an uncooperative process handler routine. The uncooperative process handler routine checks whether there has been at least one system call during the period of time defined by the timer, which in some embodiments may be on the order of 100 micro-seconds. In alternative embodiments, system calls may reset the timer to avoid triggering of the uncooperative process handler routine, but these resets may require costly kernel mode process calls. The interrupts associated with the uncooperative processor timers are handled internal to each processor (indeed, if the user process is cooperative the fact that the uncooperative process timer has expired is not communicated to other processors), and thus may be considered a different type of interrupt than the interrupts that need coordinated servicing across the various processors of the logical processor, such as input/output requests.

Figure 4A:
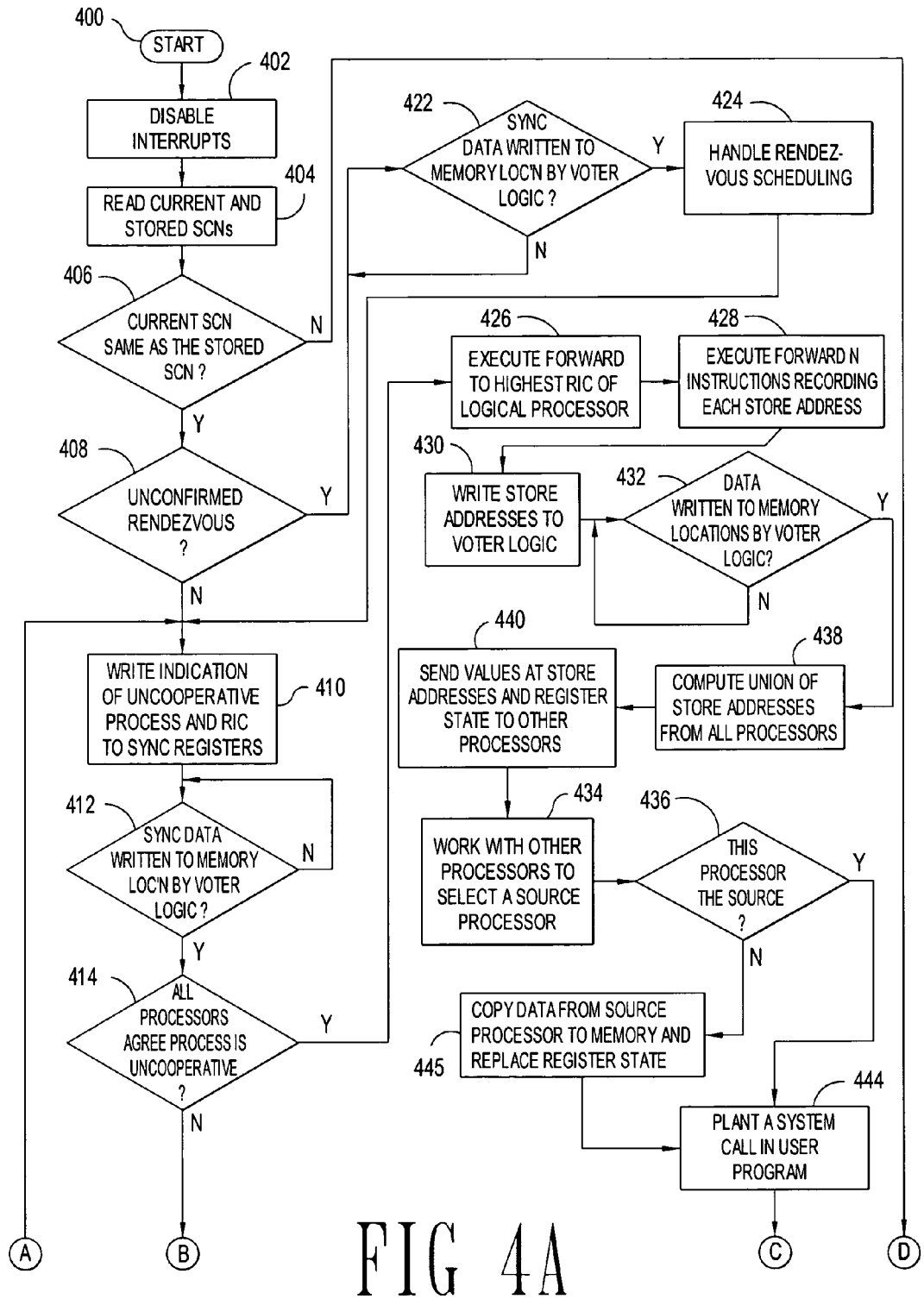
FIG. 4 (comprising 4A and 4B) illustrates a flow diagram of the uncooperative process handler in accordance with embodiments of the invention.
Figure 4B:
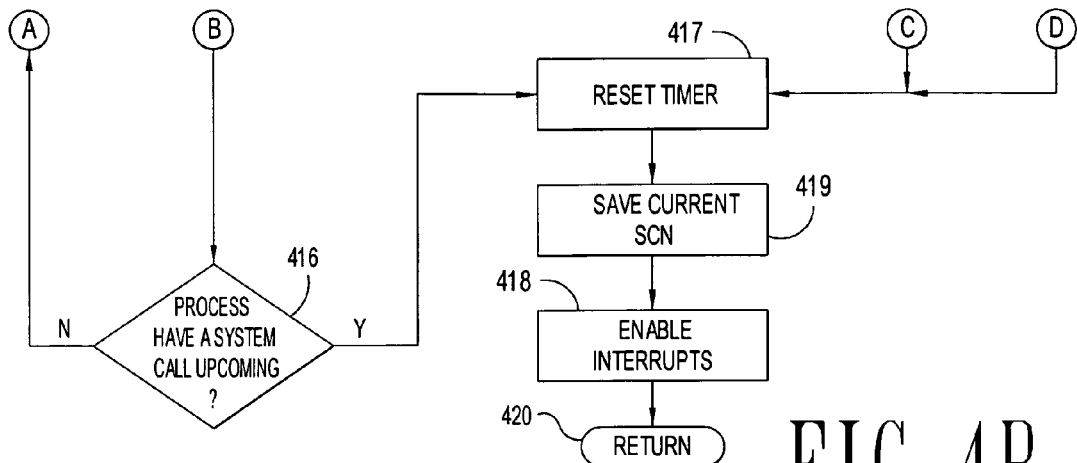

FIG. 4 (comprising 4A and 4B) illustrates a flow diagram of the uncooperative process handler in accordance with embodiments of the invention. In particular, the uncooperative process handler may start (block 400) by the assertion of an interrupt after expiration of the uncooperative process timer. After disabling interrupts (block 402), which may be an explicit step or may be automatic on entering an interrupt handler, the uncooperative process handler reads the current system call number (e.g., from location 72 of FIG. 3) and the system call number stored by the dispatcher at initiation (block 404). The current system call number being the same as the system call number stored at initiation by the dispatcher (block 406) is indicative that the user program has failed to make a system call during the period of time defined by the uncooperative process timer, and is therefore an uncooperative processes. If, on the other hand, the current system call number is not the same as the stored system call number (again block 406), the process is cooperative and therefore the illustrative method resets the uncooperative process timer (block 417), saves the current system call number (block 419), enables interrupts (block 418) and returns (block 420) to the user program.

In accordance with embodiments of the invention, a user program becoming uncooperative within at least one processor of a logical processor invokes an exchange of data with the other processors to determine if other processors in the logical processor agree to its uncooperative nature. Still referring to FIG. 4, if the current system call number is the same as the system call number stored by the dispatcher (block 406), the next step is a determination of whether there is an unconfirmed rendezvous operation (block 408) (discussed below). If there is no unconfirmed rendezvous, the next step is writing an indication of the uncooperative nature of the user program, along with the current retired instruction counter (RIC) value, to the synchronization registers 54 in the voter logic 56 (block 410). Thereafter, the uncooperative process handler routine waits in a software loop for the voter logic to return the synchronization data (block 412).

Because in accordance with some embodiments only one exchange of data may be in progress at any one time, if there is an attempt to schedule a rendezvous point that has yet to complete at the expiration of the uncooperative process timer (again block 408), an unconfirmed rendezvous, the next step is waiting in a software loop (block 422) until the voter logic writes the synchronization data. Keeping in mind that the synchronization data written back is with regard to a previous interrupt (not the uncooperative process timer expiration interrupt that triggered the current execution of the uncooperative process handler routine), the returned data is used for rendezvous point scheduling (block 424). For more information on rendezvous point scheduling, reference may be made to the U.S. patent application no. (HP Ref. 200316143-1 (CR Ref. 2162-22100)) titled, "Method and System of Loosely Lock-Stepped Non-Deterministic Processors." After rendezvous point scheduling (block 424), the process proceeds to writing an indication of the uncooperative nature of the user program, along with the current retired instruction counter value, to the synchronization registers 54 in the voter logic 56 (block 410), and waits in a software loop for return of the data (block 412).

If the processors do not agree that the user program is uncooperative (block 414), an analysis of the returned data is made to determined if the user program is cooperative in other processors (block 416). For example, while the uncooperative process timer in one processor may expire (or roll over) just prior to a system call by the user program, the user program in a second processor of the logical process may make the system call just before expiration. Thus, one processor indicates that the process is uncooperative, and the second processor attempts to schedule a rendezvous point to handle the next interrupt, including the writing of a proposed rendezvous point. If the analysis reveals the user program will soon make a system call (block 416), the uncooperative process timer is reset (block 417), the current system call number is saved (block 419), interrupts are enabled (block 418), the process returns (block 420) so that the user program can continue execution, soon to be cooperative again.

Still referring to FIG. 4, if all the processors of the logical processor agree that the user program is uncooperative (block 414), then the process of aligning the various copies of the user program begins by the processor executing forward in the user program until its retired instruction counter is the same as the highest retired instruction counter of the processors (block 426) (each processor knows the retired instruction counter value because that information is exchanged, along with an indication of the uncooperative nature of the respective programs, at block 410). In some cases, the processor in which the illustrative uncooperative process handler of FIG. 4 is operating will have the highest retired instruction counter, and thus the user program is at the proper point. Executing forward to the highest retired instruction counter value may take many forms. If the current processor's retired instruction counter value is well behind the highest retired instruction counter value, then a timer may be started and the user program may be allowed to run during the active time of the timer. Either alternatively to allowing the user program to execute for a timer period, or after a timer has been used to get the retired instruction counter close to the highest retired instruction counter value, the processor may be placed in a single instruction mode, where the user program is single-stepped until the retired instruction counter matches the highest retired instruction counter value.

Although after completing block 426 of illustrative FIG. 4 all the processors of a logical processor may be at the same retired instruction counter value, there is no guarantee that the user programs are actually at the same execution point in the instruction stream for the reasons discussed in the Background section. Thus, the next step in each processor performing the illustrative steps of FIG. 4 is to execute forward in the user program a predetermined number of instructions, designated "N" in the figure, while recording addresses of memory stores (block 428). The value of N may be determined by testing on a particular brand and model of processor, and represents at least the maximum error in retired instruction counter values as between processors presented the same instruction stream. Stated otherwise, the value of N may be the maximum number of actual instructions between the execution points of the processors when their retired instruction counters (zeroed when the user program is dispatched) are equal. In some embodiments, the value of N may be a plurality of multiples of the maximum error, and in some cases the value of N is selected to be 1000, for example.

Still referring to FIG. 4, block 428, in embodiments implemented using Itanium® processors, a user program's stores to its respective memory is recorded by setting the Itanium's® "data breakpoint register" with a mask value that triggers on each of the user program's write accesses to memory. The user program is allowed to continue for at least N instructions with interrupts enabled. During the execution of the N instructions, when the mask value in the data breakpoint register is met by a memory access, an interrupt is asserted. The asserted interrupt causes an interrupt handler to execute which records the address if the memory access was a store. So long as the user program has not executed forward N instructions, the user program is again allowed to execute, with each memory access triggering the interrupt to record the store address. In addition to setting the data breakpoint register, at least some embodiments also arm a timer set with a sufficiently large time value such that if the user program does not contain any memory accesses, and therefore no memory stores, the timer provides a way to break user program execution for a determination of whether at least N instructions have been executed. When the user program has executed forward at least N instructions, the data breakpoint register is cleared, interrupts are disabled, the illustrative process of FIG. 4 is resumed. Processors from other manufacturers may have capabilities similar to that of the Itanium® data breakpoint register, or equivalent logic may be added to provide this functionality.

After recording store addresses (if any) of the N instructions, the recorded addresses are written, or an indication that no stores were made in the N instruction is written, to the voter logic (block 430) in a fashion similar to exchange of data to determine a rendezvous point. From this point forward, a reference to recorded store addresses implicitly includes an indication that no stores were made in the N instructions. Thus, the recorded store addresses are written to the registers 54, or to registers dedicated for the exchange of recorded store addresses, of the voter logic. Keeping in mind that all the processors have agreed to the uncooperative nature of the user program, eventually all programs write the list of recorded store addresses, and once all the data is written to the voter logic, the data is written back to the processor, e.g., to registers 57. Illustrative FIG. 4 is a flow diagram from the perspective of the processor, and in particular the uncooperative process handler routine. The write-back of the data to each processor is performed by the voter logic after all the other processors of the logical processor write their respective data (or time out). Thus, the step 432 illustrates each processor waiting for the voter logic to return data. Depending on the size of the data set, the exchange of information through the synchronization logic may take several iterations, and thus the methods illustrated by blocks 430 and 432 may be repeated multiple times. Thus, each processor waits in a software loop (block 432) for the return of recorded store addresses from the other processors.

The next step is for each processor to compute the union of the store addresses from the information provided by all the processors (block 438). For example, if a first processor records a store address set of {1,2,3,4}, and a second processor records a store address set of {2,3,4,5}, then the union of the recorded store addresses would be {1,2,3,4,5}. The union of the recorded store addresses represents a list of memory locations where the memory among the processors could differ. Thereafter, each processor sends the values at each of its store addresses of the union to the other processors in the logical processor, along with the user program's register state (block 440). In this way, each processor in the logical processor has all the information needed to internally correct its memory and register state based on which processor in the logical processor is the source processor.

The next step is for the processors to work together to identify a source processor (block 434). The source processor need not be the processor that is ahead in execution point, and in fact the selection of a source processor may be arbitrary. Working together to select a source processor could involve an exchange of information through the voter logic, such as writing to registers 54, and the voter logic returning data supplied from each processor to all the processors. In some embodiments, the source processor is predetermined, and thus blocks 434 and 436 may take place at other times, such as when processors are brought on line or when the processors are suspected of failure. Other methods may be equivalently used. If the processor in which the illustrative method of FIG. 4 is operating is the source processor (block 436), replacing data is not required. Thus, and skipping for now block 444, the uncooperative process timer is reset (block 417), the current system call number is saved (block 419), interrupts are enabled (block 418), and the process returns (block 420) to the user program.

If, on the other hand, the processor in which the illustrative process is running is not the source (again block 436), then the processor takes values at each store address and the user program register state from the source processor and replaces its corresponding memory values and register state (block 445). The register state comprises the current program counter value, along with the states of the various registers of the processor that define the current context and execution point of the user program. When execution resumes in the non-source processors, they resume at the same location as the source processor, and have the same memory state.

In accordance with at least some embodiments, forcing alignment when each processor agrees to the uncooperative nature of a user program alone may be sufficient to ensure proper operation in spite of a user program's uncooperative nature. In at least some embodiments, each processor plants a system call in the user program (block 444) to ensure that at least the portion of the user program that caused the uncooperative process designation does not do so again. The proactive steps may take many forms. In some embodiments, the offending portion of the user program (most likely a software loop) is modified to contain a system call. This is accomplished, for example, by replacing no-operation instructions (NOPs) with system calls (e.g., a time of day call). If the user program instruction stream does not allow for mere replacement, an instruction is replaced with a branch instruction that points to the replaced instruction, a system call, and a return branch instruction. These modifications may be made to the user program as it exists in the main memory and/or made to the user program as it exists on a long term storage device, such as a disk drive. In yet further alternative embodiments, processor hardware may support a mechanism for insertion of an interrupt at a particular point in the instruction stream, and the interrupt may trigger the system call for alignment and interrupt scheduling. For example, the Itanium® processor family supports registers within the processor known as "instruction breakpoint registers." The breakpoint registers may be loaded with an instruction pointer value, and when the actual instruction pointer matches value in the breakpoint register, an interrupt is triggered. This exemplary mechanism is used to trigger an interrupt, which in turn triggers a system call for synchronization purposes. The hardware based mechanism may not be available in all architectures, but the embodiments of modifying the user program may have universal application. Thereafter, the uncooperative process timer is reset (block 417), the current system call number is saved (block 419), interrupts are enabled (block 418), and the interrupt handler returns (block 420) to the user program.

In the case where there are no memory stores within the N executed instructions, each non-source processor replaces only its register state with the register state of the source processor, and when the user programs resume execution they resume at the same point. Because N is determined to be the maximum error as between execution points of the user programs, if no memory stores occur during those N instructions, then having each user program resume at the same point without changing their respective memories is operational because their memories do not differ. Thus, it is seen that the various embodiments described herein have significant advantages over, for example, cloning entire user program's memory and/or cloning memory pages because significantly less data may need to be exchanged, and in the best case no data is exchanged at all, save the user program's register state.

Figure 5A:
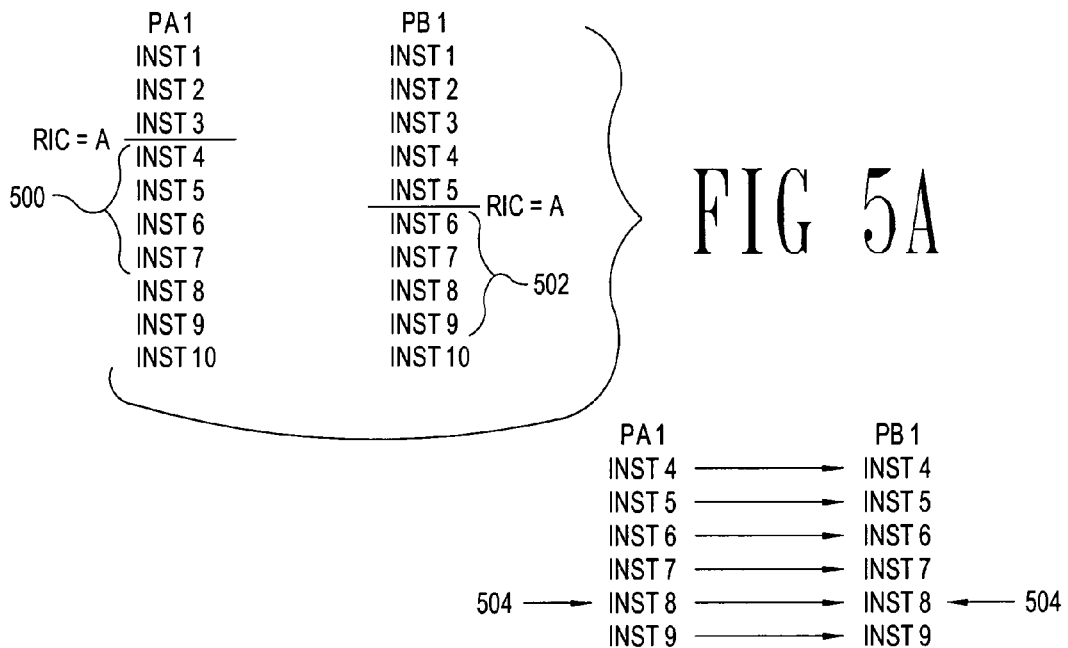
FIGS. 5A, 5B and 5C show a plurality of instructions to illustrate the method of FIG. 4.

FIG. 5A shows a plurality of instructions executed by two processors, PA1 and PB1 to further illustrate the concepts of FIG. 4. The explanation is equally applicable to three processors, but two are used so as not to unduly complicate the figure. In particular, consider that each processor has determined that its respective user program, comprising instructions (INST) 1-10, is uncooperative (blocks 410, 412, and 414 of FIG. 4). Further consider that each processor has stepped the user program to the highest retired instruction pointer value (in this case RIC=A) (block 426 of FIG. 4). Because of imperfections in hardware responsible for counting retired instructions, the execution point in the user program may be different as between the two processors in spite their equal retired instruction counter values. FIG. 5 illustrates processor PB1 ahead of PA1 by two instructions in spite of their equal retired instruction counter values. Further consider that the highest possible error in counting retired instructions across a number of instructions encountered during an average time slice for the user program is determined, possibly through empirical testing, to be two.

In this illustrative case the value of N may be set equal to a value of two or greater, and four is used. Each user program is allowed to step forward four instructions while making a list of store addresses (block 428 of FIG. 4). For this illustration, consider that each instruction is a memory store, and thus each processor records a store address for each instruction. The addresses 500 recorded by processor PA1 are thus the store addresses for instructions {4,5,6,7}. Likewise, the addresses 502 recorded by processor PB1 are thus store addresses for instructions {6,7,8,9}. The recorded store addresses are exchanged between the processors (blocks 430, 432 of FIG. 4). Each processor then calculates the union of the store addresses (block 438 of FIG. 4) to be {4,5,6,7,8,9} (block 438 of FIG. 4). Given the assumptions, the union of the two sets represents all the locations where the memory of the two processors could differ (with a margin for error). Thereafter, the values at the union of the store addresses are exchanged among the processors (block 440 of FIG. 4). A source processor is then selected (blocks 434 and 436 of FIG. 4) and all non-source processors replace values of memory addresses of the union with values from the source processor, and also replace their respective register state with that of the source processor (block 445 of FIG. 4).

Figure 5B:
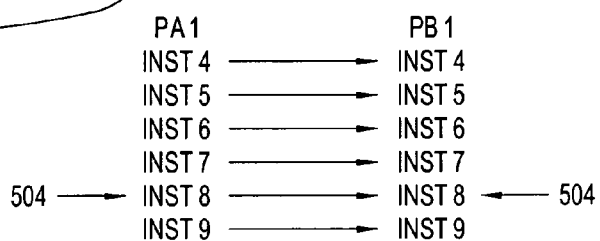
Figure 5C:
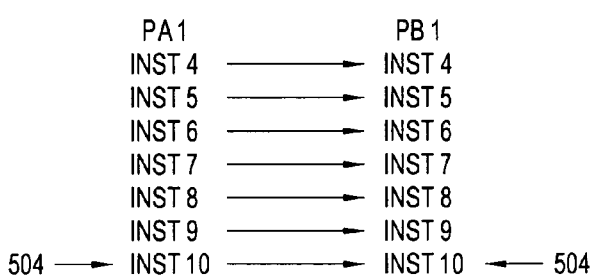

FIG. 5B illustrates a case where processor PA1 is selected as source, and thus the values and register state of processor PA1 replace the values and register state of processor PB1. When each of the processors resumes in this first illustrative case, they begin execution at instruction 8 (arrow 504). While processor PB1 duplicatively executes instructions 8 and 9, the effects of the previous execution are reversed by the copy of the data from processor PA1. Likewise, FIG. 5C illustrates a case where processor PB1 is selected as source, and thus the values and register state of processor PB1 replace the values and register state of processor PA1. When each of the processors resumes in this second illustrative case, they begin execution at instruction 10 (arrow 506). While processor PA1 did not execute the instruction 8 and 9, the effects of those instructions are present nonetheless because of the copy of the values of the memory locations from processor PB1 and also the copy of the register state.

Providing the values of the memory locations from the processor selected as source may take many forms. In some embodiments, the values of the memory locations are exchanged using the respective voter logic for the logical processor. Use of the voter logic may be practical when the amount of data to exchange is relatively small, such as where N is small. In other embodiments, the values of the memory locations are exchanged using the reintegration logic 48 (FIG. 2) of each processor. In yet further embodiments, values of the memory locations are exchanged using packet messages across network 17 (FIG. 1).

Figure 6:
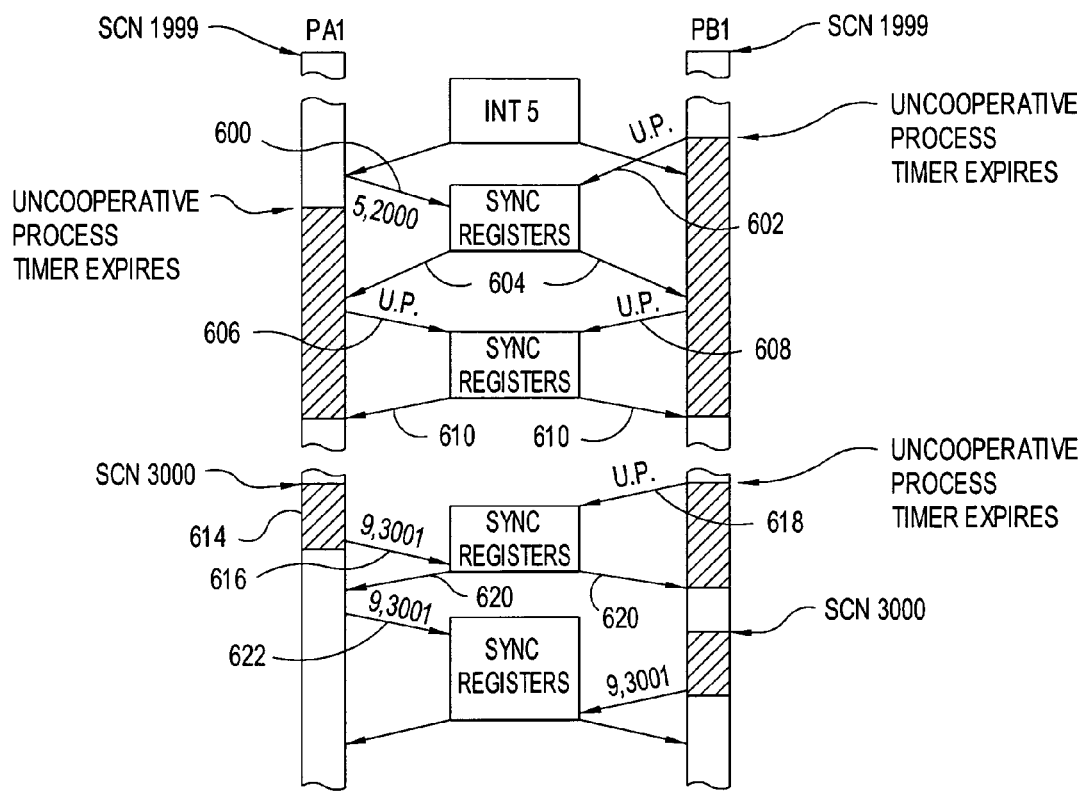
FIG. 6 is an illustrative timeline of handling an uncooperative process in relation to event interrupts in accordance with embodiments of the invention.

FIG. 6 is a timeline illustrating handling of an uncooperative process in relation to event interrupts to further illustrate the methods of FIG. 4. In particular, FIG. 6 illustrates a situation where each processor sees system call number 1999. In the case of processor PA1, interrupt 5 is asserted prior to expiration of the uncooperative process timer, and thus processor PA1 proposes servicing of interrupt 5 at system call number 2000 (line 600). Soon after proposing service of interrupt 5, the uncooperative process timer for processor PA1 expires, and because of the unconfirmed rendezvous processor PA1 spins (block 422 of FIG. 4) waiting for the voter logic to write synchronization data from the previous proposal. Processor PB1, by contrast, has its uncooperative process timer expire before the interrupt is asserted, and thus processor PB1 writes uncooperative process information to the synchronization registers 54 (line 602; block 410 of FIG. 4) and waits in a software loop for confirmation (blocks 412 of FIG. 4). The voter logic then writes the synchronization data back to each processor (line 604). Because the processors do not agree to servicing of the interrupt, and because of the urgency of uncooperative process interrupts, processor PA1 writes interrupt 5 to a list so that it may be proposed again in the future (block 424), writes the indication of the uncooperative process to the synchronization registers (line 606; block 410 of FIG. 4), and waits in a software loop for confirmation (block 412 of FIG. 4).

With regard to processor PB1, the processors do not agree regarding the uncooperative process (block 414) (processor PA1 proposed servicing an interrupt rather than an indication that the application program is uncooperative). Moreover, the system call number proposed by processor PA1 (in this exemplary case system call 2000) does not suggest that a system call in processor PB1 is upcoming; rather, the proposed system call number of 2000 implies that processor PA1 is also standing at system call number 1999 (block 416 of FIG. 4). Thus, processor PB1 makes a second write of an indication of an uncooperative process (line 608; block 410 of FIG. 4), and again waits in a software loop for confirmation (block 412). At some time thereafter, the voter logic 56 writes the synchronization data to each processor (lines 610). In this exemplary second write, the processors agree to the uncooperative status (block 414 for each processor), and thus each processor begins the process of aligning the execution points of the user programs.

FIG. 6 also illustrates a situation where, in spite of a mismatch of synchronization data written to the voter logic, a processor gleans information that the uncooperative nature of the user program may soon end. In particular, FIG. 6 further illustrates processor PA1 making a system call (region 614), in this illustrative case system call number 3000. As part of the system call process, processor PA1 proposes or advertises the next rendezvous point (line 616). Processor PB1, by contrast, has its uncooperative process timer expire prior to the system call, and therefore writes an indication of the uncooperative process (line 618; block 410 of FIG. 4) and waits in a software loop for confirmation (block 412 of FIG. 4). When the voter logic returns the synchronization data (lines 620), processor PA1 sees a mismatch and attempts again to write synchronization data (line 622; block 414 of FIG. 4). Processor PB1, by contrast, receives the synchronization data (line 620), and while the processors do not agree as the uncooperative nature of the user program (block 414 of FIG. 4), the proposed rendezvous information from processor PA1 shows that a system call is upcoming (block 416 of FIG. 4). Thus, processor PB1 continues execution of the user program until the system call is made. At some later time the processors agree to the interrupt originally proposed by processor PA1.

The embodiments described to this point has assumed a static, and previously determined, value of N. In alternative embodiments, the value of N is adaptively changed. FIG. 7 illustrates a flow diagram of an algorithm to implement adaptive changes to the value of N. The illustrative method of FIG. 7 may be implemented as a stand-alone process, or may be incorporated within the method of FIG. 4, e.g., between executing forward until retired instruction count values match (block 426 of FIG. 4) and executing forward N instructions (block 428 of FIG. 4). The process starts (block 700) and moves to gathering evidence of the accuracy of the retired instruction counter. In some embodiments, the values of the instruction pointers as between the processors are compared when the retired instruction counter values are equal. For example, if instruction pointers are the same when retired instruction counter values are equal, then this is evidence of no error in the retired instruction counter. Thus, these embodiments require the exchange of the instruction pointers after stepping forward to the highest retired instruction counter value, such as by exchanging the instruction pointers using the synchronization logic. In alternative embodiments each processor compares the size of its recorded store address set to the union of the store address sets. For example, if a processor calculates the size of its store set to be five entries, and the size of the union of all the store address sets to be five entries, then this is evidence that there is no or only small error in retired instruction counter values as between the processors. By contrast, if a processor calculates the size of its store address set to be five entries, and the size of the union to be ten (in a dual-modular redundant system) or fifteen (in a tri-modular redundant system), this is evidence that the error in the retired instruction counter values is either equal to, or greater than, the selected or provided value of N.

Regardless of the precise mechanism of gathering evidence of the accuracy of the retired instruction counter, the next step is a determination of whether the evidence indicates the error of the retired instruction counter approaches the value of N (block 704), e.g., whether the evidence suggests the error is greater than or equal to N. If so, the value of N should be adjusted (block 706), and the evidence log reset (block 716) (discussed more below). Increasing, or decreasing, the value of N could be completed by each processor without consultation of other processors, or the decision to increase the value of N could invoke an exchange of data by the processors to agree on the precise value of the change.

If the evidence does not suggest that the inaccuracy of the retired instruction counter is approaching the value of N, then the next step is logging gathered evidence (block 708). Thus, while increasing the value of N should be done even if one instance of gathered evidence shows the error of the retired instruction counter could be greater than N (blocks 704 and 706) (because in this instance it is possible that the duplicate copies of the user program are not being correctly aligned), lowering the value of N is made based on a large set of evidence. If the size of the evidence set is insufficiently large (block 710), the process ends (block 718). If, on the other hand, the size of the evidence set is sufficiently large (block 712), e.g., a week of data or a month of data, then a determination is made as to whether potential errors in the retired instruction counter values is much smaller than the current value of N (block 712). For example, if the accuracy of the retired instruction counter values as between the processors is ten counts or less, but N is on the order 1000, then the value of N could be reduced (block 714). On the other hand, if the accuracy of the retired instruction counter values as between the processors is 100 counts, and N is on the order 200, then the value of N should not be changed. In the next step, the log of evidence is reset (block 716), and the process ends (block 718).

The above discussion is meant to be illustrative of the principles and various embodiments of the present invention. Numerous variations and modifications will become apparent to those skilled in the art once the above disclosure is fully appreciated. For example, while it was stated that if an Itanium® processor is used that compiler-based speculative instructions may be used, the illustrative methods and systems described above do work with processor-based speculation (e.g., branch prediction speculation and instruction reordering) inasmuch as a processor-based speculation may not adversely impact a retired instruction counter. Further, while various embodiments described above are in relation to performing the data exchange only upon a determination that the user programs are uncooperative as that term has been defined, in alternative embodiments of the invention the recording of memory stores, and exchange of data and register states may take place at any convenient time, such as at the assertion of an interrupt and/or on every system call. Moreover, the illustrative embodiment of FIG. 4 describes each processor executing forward until their retired instruction counter values match; however, differences in retired instruction counter values when executing N instructions may be accounted for in the size of the N value. For example, if the processors have differences in retired instruction count values of 100 instructions, then the value of N may be 100 plus the maximum amount of error that can be expected for the retired instruction counter. It is intended that the following claims be interpreted to embrace all such variations and modifications.

What is claimed is:

1. A processor-based method comprising:
   determining that duplicate copies of a user program executed in a first and second processor have differing execution points within the user program;
   copying only data of memory stores performed by the user program in the first processor from a memory of the first processor to a memory of the second processor;
   copying a register state of the user program from the first processor for use by the second processor; and
   resuming execution of the duplicate copies of the user program in each of the first and second processors.

2. A processor-based method comprising:
   aligning the execution point of duplicate copies of a user program executed in a first and second processor by:
      allowing at least one of the user programs to execute until retired instruction counter values in each of the first and second processor are substantially the same;
      executing a predetermined number of instructions of each user program;
      recording memory addresses of locations where each of the user programs store data to memory, the recording substantially simultaneously with executing;
      determining a union of the memory addresses where each of the user programs store data;
      copying only data from memory addresses defined by the union of memory addresses from a memory or the first processor to a memory of the second processor; and
      copying a register state of the user program from the first processor for use by the second processor.

3. The processor-based method as defined in claim 2 wherein executing a predetermined number of instructions further comprises executing a number of instructions being at least as great as a number of instructions the retired instruction counter in each processor could be in error.

4. The processor-based method as defined in claim 2 wherein recording and determining further comprise:
   making a first list by the first processor, the first list comprising memory addresses where the user program of the first processor stores data while executing the predetermined number of instructions;
   making a second list by the second processor, the second processor comprising memory addresses where the user program of the second processor stores data while executing the predetermined number of instructions;
   exchanging between the first and second processor their respective lists; and
   determining the union using the first and second lists.

5. The processor-based method as defined in claim 1 further comprising:
copying only data of memory stores performed by the user program in the first processor from a memory of the first processor to a memory of the second processor and to a memory of a third processor; and
copying a register state of the user program from the first processor for use by the second and third processor.

6. The processor-based method as defined in claim 1 wherein determining further comprises determining that the duplicate copies of the user program have each failed to make a system level call within a predetermined period of time.

7. The processor-based method as defined in claim 6 wherein determining further comprises:
providing information from the first processor to the second processor, the information indicating that an user program executed on the first processor has not made a system level call in a predetermined amount of time; and
determining by the first processor, using information from the second processor, whether a duplicate copy of the user program executed in the second processor has made a system level call in the predetermined amount of time.

8. A processor-based method comprising:
aligning the execution point of duplicate copies of a user program executed in a first and second processor by:
allowing at least one of the user programs to execute until retired instruction counter values in each of the first and second processor are substantially the same;
executing a predetermined number of instructions of each user program, the predetermined number being at least as great as a number of instructions the retired instruction counter in each processor could be in error;
recording memory addresses of locations where each of the user programs store data to memory, the recording substantially simultaneously with executing;
determining a union of the memory addresses where each of the user programs store data;
copying only data from memory addresses defined by the union of memory addresses from a memory of the first processor to a memory of the second processor;
copying a register state of the user program from the first processor for use by the second processor;
gathering evidence of the accuracy of the retired instruction counter values; and
adjusting the predetermined number based on the gathered evidence.

9. The processor-based method as defined in claim 8 wherein adjusting further comprises one of increasing the predetermined number if the evidence of the accuracy suggests the inaccuracy of the retired instruction counter values is equal to or greater than the predetermined number, or decreasing the predetermined number if the evidence of the accuracy suggests the inaccuracy of the retired instruction counter values is less than the predetermined number.

10. The processor-based method as defined in claim 8 wherein gathering further comprises determining whether instruction pointer values of the duplicate copies of the user program are equal when their retired instruction counter values are equal.

11. The processor-based method as defined in claim 8 wherein gathering further comprises determining a number of recorded memory address locations by the first processor in relation to a number of recorded memory address locations in the union of memory addresses.

12. A processor-based method comprising:
determining that the duplicate copies of a user program executed in a first and second processor have each failed to make a system level call withn a predetermined period of time; then
aligning the execution point of duplicate copies of the user program by:
copying only data of memory stores performed by the user program in the first processor from a memory of the first processor to a memory of the second processor;
copying a register state of the user program from the first processor for use by the second processor; and
inserting a system call in each user program within the portion of the user program in each processor determined to have not made a system call within the predetermined period of time.

13. A system comprising:
a first processor that executes a user program, the first processor coupled to a first memory; and
a second processor that substantially simultaneously executes a duplicate copy of the user program, the second processor coupled to a second memory;
wherein the first processor is operable to provide the second processor data from memory store locations of the first memory, and wherein the first processor is operable to provide register state of the user program to the second processor;
wherein prior to when the first processor provides data, the first processor is operable to execute a predetermined number of instructions of its respective user program and substantially simultaneously operable to create a first list of addresses of memory stores in the predetermined number of instructions;
wherein prior to when the first processor provides data, the second processor is operable to execute a predetermined number of instructions of its respective user program and substantially simultaneously operable to create a second list of addresses of memory stores in the predetermined number of instructions;
wherein the first and second processor are operable to exchange their respective lists; and
wherein the data provided by the first processor is data from the memory locations of the union of the first and second list.

14. The system as defined in claim 13 further comprising:
a data exchange logic coupled between the first and second processors;
wherein to exchange the first and second list the first processor is operable to write the first list to the data exchange logic, the second processor is operable to write the second list to the data exchange logic, and thereafter the data exchange logic is operable to write at least the first list to the second memory and writes the second list to the first memory.

15. The system as defined in claim 14 wherein the first processor is operable to provide data from memory locations of the first memory by writing the data to the data exchange logic, and wherein the data exchange logic is operable to provide the data to the second memory.

16. The system as defined in claim 14 wherein the first processor is operable to provide the register state of the user program by writing the register state to the data exchange logic, and wherein the data exchange logic is operable to write the second memory.

17. The system as defined in claim 13 further comprising:
a first retired instruction counter associated with the first processor that changes state at least at completion of substantially each user program instruction; and
a second a retired instruction counter associated with the second processor that changes state at least at completion of substantially each duplicate copy user program instruction;
wherein, prior to when each processor executes the predetermined number of instructions, at least one processor is operable to execute instructions until the value of the first and second retired instruction counters are substantially equal.

18. The system as defined in claim 17 wherein the first and second retired instruction counters increment on substantially each completion of a user program instruction of their respective processors.

19. The system as defined in claim 17 wherein, prior to the exchange of the first and second list, the first processor is operable to write the first retired instruction count value to the data exchange logic, the second processor is operable to write the second retired instruction counter value to the data exchange logic, and the data exchange logic is operable to write at least the first retired instruction counter value to the second memory and the second retired instruction counter value to the first memory.

20. A computer-readable media storing a program that, when executed by a first processor, causes the processor to:
analyze data to determine whether a user program executed in the first processor, and a duplicate copy of the user program executed in a different processor, have failed to make a system call in a predetermined period of time; and if so
allow a predetermined number of instructions of the user program in the first processor to execute and substantially simultaneously record addresses of memory stores; and
at least one selected from the group consisting of:
provide data values of memory stores of the user program executed in the first processor where memory could be different than memory of the duplicate copy of the user program in the different processor based on the addresses or memory stores; and receive from the different processor data values of memory stores of the duplicate copy of the user program where memory could be different than memory of the user program memory in the first processor.

21. The computer-readable media as defined in claim 20 wherein the program, prior to allowing the processor to execute instructions, causes the processor to allow execution of the user program until a retired instruction counter value is substantially equal to a retired instruction counter value in the different processor.

22. The computer-readable media as defined in claim 20 wherein the program further allows the processor to execute a number of instructions being at least as great as a number of instructions the retired instruction counter could have miscounted.

23. The computer-readable media as defined in claim 20 wherein the program, prior to causing the processor to provide data values or receive data values, causes the processor to:
send to the different processor a first list of addresses of memory stores of the user program;
receive from the different processor a second list of addresses of memory stores of the duplicate copy of the user program, the second list generated while the duplicate copy of the user program executed a predetermined number of instructions; and
create a third list being the union of the first and second lists.

24. The computer-readable media as defined in claim 23 wherein when the processor provides data values, the program further causes the processor to provide data values of the memory locations on the third list to the different processor.

25. The computer-readable media as defined in claim 20 wherein the program, prior to causing the processor to provide data values or receive data values, further causes the processor to select a source processor as between the processor and the different processor, and if the process is the source, provide data values, and the different processor is the source, receive data values.

26. The computer-readable media as defined in claim 20 wherein the program, prior to causing the processor to analyze, causes the processor to:
write an indication that the user program has failed to make a system call in a predetermined period of time along with a value of a retired instruction counter to a data exchange logic; and
receive from the data exchange logic data from the different processor indicating a state of the duplicate copy of the user program.

27. A system comprising:
a first means for executing programs that executes a user program, the first means for executing coupled to a first means for storing programs and data; and
a second means for executing programs operable to substantially simultaneously execute a duplicate copy of the user program, the second means for executing coupled to a second means for storing programs and data;
wherein the first means for executing is operable to provide to the second means for executing only data from memory store locations of the first means for storing, and wherein the first means for executing is operable to provide register state of the user program to the second means for executing;
wherein prior to when the first means for executing provides data, the first means for executing is operable to execute a predetermined number of instructions of its respective user program and substantially simultaneously operable to create a first list means of addresses of memory stores in the predetermined number of instructions;
wherein prior to when the first means for executing provides data, the second means for executing is operable to execute a predetermined number of instructions of its respective user program and substantially simultaneously operable to create a second list means of addresses of memory stores in the predetermined number of instructions;
wherein the first and second means for executing are operable to exchange their respective lists means; and
wherein the data provided by the first means for executing is data from the locations of the first means for storing identified in the union of the first and second list means.

28. The system as defined in claim 27 further comprising:
a means for data exchange coupled between the first and second means for executing;
wherein to exchange the first and second list means the first means for executing is operable to write the first list means to the means for data exchange, the second means for executing is operable to write the second list means to the means for data exchange, and thereafter the means for data exchange logic is operable to write at least the first list means to the second means for storing and writes at least the second list means to the first means for storing.

29. The system as defined in claim 27 further comprising:
a first means for holding a value of retired instruction of the user program associated with the first means for executing; and
a second means for holding a value of retired instruction of the user program associated with the second means for executing;
wherein, prior to when each of the means for executing executes the predetermined number of instructions, at least one of the means for executing is operable to execute instructions until the value of the first and second means for holding are equal.

30. The system as defined in claim 29 further comprising:
wherein the first means for holding increments on each completion of a user program instruction of the first means for executing; and
wherein the second means for holding increments on each completion of a user program instruction of the second means for executing.

31. The system as defined in claim 29 wherein, prior to the exchange of the first and second list means, the first means for executing is operable to write the value of the first means for holding to the means for data exchange, the second means for executing is operable to write the value of the second means for holding to the means for data exchange, and the means for data exchange is operable to write at least the value of the first means for holding to the second means for storing and also writes the value of the second means for holding to the first means for storing.

* * * * *

UNITED STATES PATENT AND TRADEMARK OFFICE
CERTIFICATE OF CORRECTION

| | |
|---|---|
| PATENT NO. | : 7,328,331 B2 |
| APPLICATION NO. | : 11/042427 |
| DATED | : February 5, 2008 |
| INVENTOR(S) | : Paul Del Vigna, Jr. et al. |

It is certified that error appears in the above-identified patent and that said Letters Patent is hereby corrected as shown below:

In column 16, line 44, in Claim 2, delete "or" and insert -- of --, therefor.

In column 18, line 6, in Claim 12, delete "withn" and insert -- within --, therefor.

In column 19, line 43, in Claim 20, delete "or" and insert -- of --, therefor.

Signed and Sealed this

Fifteenth Day of July, 2008

JON W. DUDAS
*Director of the United States Patent and Trademark Office*